J. H. WESTENHAVER & E. K. ADAIR.
Fence Wire-Tighteners.
No. 152,784. Patented July 7, 1874.
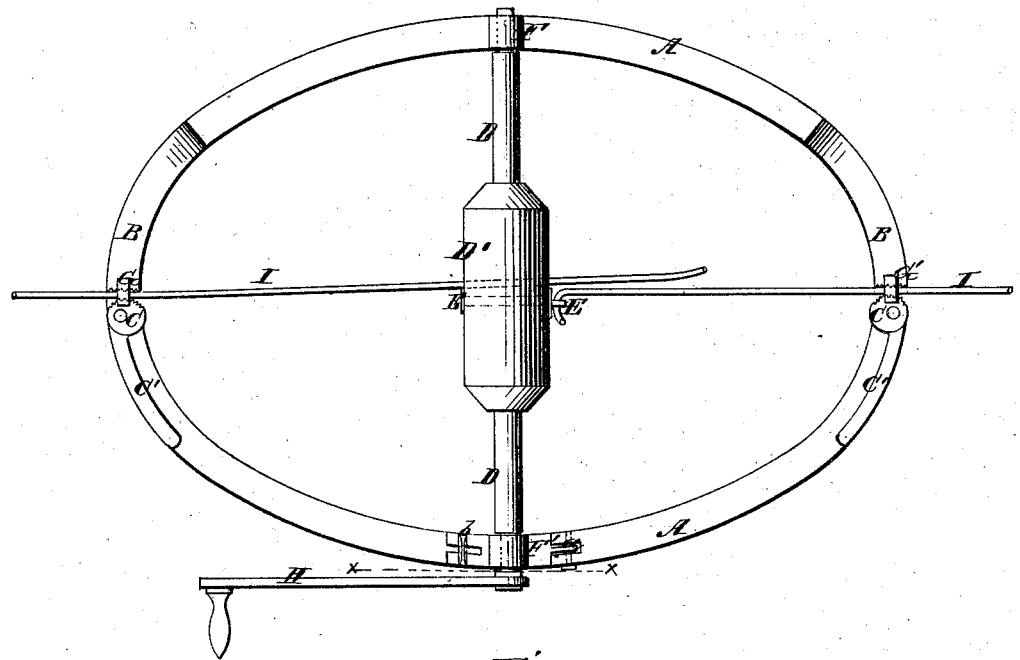

UNITED STATES PATENT OFFICE.

JESSE H. WESTENHAVER AND EVAN K. ADAIR, OF IOWA CITY, IOWA.

IMPROVEMENT IN FENCE-WIRE TIGHTENERS.

Specification forming part of Letters Patent No. 152,784, dated July 7, 1874; application filed May 14, 1874.

*To all whom it may concern:*

Be it known that we, JESSE H. WESTENHAVER and EVAN K. ADAIR, of Iowa city, county of Johnston, State of Iowa, have invented a new and Improved Machine for Tightening and Splicing Wire Fences; and we do hereby declare that the following is a full, clear, and exact description thereof, reference being had to the accompanying drawings making part of this specification, in which—

Figure 1 is a front elevation of the stretching part of our implement adjusted upon a wire fence which is to be stretched and spliced. Fig. 2 is a section in the line $x\ x$ of Fig. 1, looking at the bottom edge of the implement shown in Fig. 1. Fig. 3 is an end elevation of the implement shown in Fig. 1. Figs. 4, 5, 6, and 7 are views showing the tongs and twisting device used with the implement shown in Fig. 1. Fig. 8 is the splice and twisted joint which our implement and tools enable us to make on the wires of the fence.

The nature of our invention consists, first, in a light oblong frame, of oval or other suitable form, having a clamping-jaw at each end and a drawing or stretching roller midway, and at right angles to said jaws, arranged upon it, as will be hereinafter described; second, in the combination of projecting rests with the frame and jaws; third, in the combination of clamping-tongs constructed to take the place of the roller upon the frame, with the frame and its clamping-jaws, as will be hereinafter described; fourth, it consists in a twisting-bar having a hole through it, and a lip on each side of the hole, in combination with the tongs, frame, and its jaws, as will be hereinafter described.

By means of the first part of our invention the wires of a fence can be stretched or made taut and the tension retained. By the second, the machine can be supported while a part of it is being removed; and by the third part of our invention the ends of the wire lapping one another can be gripped and held; and by the fourth part of our invention the twist which fastens the spliced ends of the wires can be produced in a very regular manner.

To enable others skilled in the art to make and use our invention we will proceed to describe it.

A represents the frame in form of an oval; B B, serrated stationary jaws constructed on the face of the frame just above the major axis of the frame. C C are eccentric jaws of levers C' C'. These jaws are on the same face of the frame as the jaws B, being pivoted to the frame at points a little below the said axis of the frame. The jaws B and C are far enough apart to admit the wires of a fence between them when opened, but when they are closed the wire is firmly clamped by the eccentric bite or pressure of the jaws C C upon them. D is a vertical shaft arranged across the center of the frame at its minor axis. On this shaft a roller, D', is firmly fastened by means of a loop-bolt, E, which serves another purpose, which will be presently set forth. The shaft D has its ends confined to the face of the frame by half-boxes F F'. The box F is fixed and the box F' is connected to the frame by a hinge, $a$, and a turn-button fastening, $b$. In that end of the box F' which is confined by the button an open slot is cut so as to admit the head of the button to pass through it when the button-head is turned parallel with it. By this construction the shaft can be removed when the wires of a fence have been stretched by the roller and clamped by the jaws. G G' are two angular projections. They extend out from the jaws B B and down in front of the eccentric jaws of the levers a short distance, for the purpose of resting the machine on the wire of the fence while the shaft with the roller is being removed from the frame. H is a crank on the end of a shaft; I I, detached parts of a wire fence. J is a pair of tongs with an extension, J¹, beyond the pivot of the jaws. The extreme end of this extension is slotted parallel with the pivot of the jaws so as to be slipped upon the frame A from the inner edge, as illustrated in Fig. 4, after the shaft with the roller is removed. The handles of the jaws are held closed by means of a notch stop-bar, J², which is pivoted to the lower handle as shown. These tongs are made to receive the two ends of the wire between their jaws, and then are slipped upon the frame, as before mentioned.

At K the tongs are provided with a cutter by which the wires can be severed whenever necessary. K' is a twisting-bar constructed with a hole, $d$, through it, and with two lips, $d^1$ $d^2$, as shown. These lips are so set with respect to the hole $d$, and the faces of the bar, that they keep the bar level with the wire that is being coiled to fasten the splice. The frame and roller may be made of cast-iron or other suitable material.

The operation is as follows: The machine is placed upon the wire which is to be stretched and spliced. The wire is then cut and one end fastened in the loop of the bolt E. The roller is turned until the desired tension is received. The stretched wire is clamped by the jaws at one end. The end of the stretched wire is removed from the loop, and the end of the other part of the wire fastened in the loop, and the roller turned until it is stretched to the desired degree, when this wire is clamped between the jaws at the other end of the frame. The roller is now removed, and the tongs made to take the wires between their jaws, when the jaws are closed tight upon the wires and the tongs slipped upon the frame. The twister K' is now brought into use and the wire twisted, as illustrated in Fig. 8.

This machine is very convenient and simple, and can be operated by almost any one who understands its use.

What we claim as our invention, and desire to secure by Letters Patent, is—

1. The combination of the frame A, stretching-roller D', and clamping-jaws, substantially in the manner and for the purpose described.

2. The combination of the angular projections G G' with the frame and jaws, substantially as and for the purpose described.

3. The tongs J, with slotted extension J¹, in combination with the frame A and jaws C C, substantially as and for the purpose described.

4. The twisting-bar having a hole, $d$, through it, and a lip, $d^1$ $d^2$, on each side of the hole $d$, in combination with the tongs J, frame A, and its jaws C C, substantially as and for the purpose described.

JESSE H. WESTENHAVER.
EVAN K. ADAIR.

Witnesses:
ALEX. H. GRAHAM,
SAML. F. ADAIR.